(12) United States Patent
Wikeley et al.

(10) Patent No.: US 11,751,566 B2
(45) Date of Patent: *Sep. 12, 2023

(54) GROWTH REGULATOR CONCENTRATE AND USE THEREOF

(71) Applicant: FINE AGROCHEMICALS LIMITED, Whittington (GB)

(72) Inventors: Philip Simon Wikeley, Malvern (GB); Graham Seaman, Locks Heath (GB); Wim Aelbrecht, Opwijk (BE); Joëlle Reignard, Wiener Neustad (AT)

(73) Assignee: FINE AGROCHEMICALS LIMITED, Whittington (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,334

(22) Filed: Sep. 6, 2021

(65) Prior Publication Data

US 2021/0392887 A1 Dec. 23, 2021

Related U.S. Application Data

(63) Continuation of application No. 15/047,711, filed on Feb. 19, 2016, now Pat. No. 11,134,682.

(30) Foreign Application Priority Data

Aug. 23, 2013 (EP) .................................... 13181619

(51) Int. Cl.
*A01N 25/02* (2006.01)
*A01N 37/10* (2006.01)
*A01N 43/653* (2006.01)
*A01N 43/08* (2006.01)
*A01N 57/20* (2006.01)

(52) U.S. Cl.
CPC ............. *A01N 43/08* (2013.01); *A01N 25/02* (2013.01); *A01N 37/10* (2013.01); *A01N 43/653* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 11,134,682 B2 * | 10/2021 | Wikeley | A01N 57/20 |
| 2012/0035054 A1 * | 2/2012 | Ehr | A01N 25/28 |
| | | | 504/273 |

FOREIGN PATENT DOCUMENTS

| | | | | |
|---|---|---|---|---|
| EP | 2225940 A1 * | 9/2010 | ............. | A01N 43/40 |
| WO | WO-2011012495 A1 * | 2/2011 | ............. | A01N 25/14 |
| WO | WO-2012167322 A1 * | 12/2012 | ............. | A01N 25/04 |

* cited by examiner

*Primary Examiner* — Alton N Pryor
(74) *Attorney, Agent, or Firm* — David P. Owen; HOYNG ROKH MONEGIER B.V.

(57) ABSTRACT

The invention relates to a liquid dispersion comprising (i) at least one growth regulator which has a solubility in vegetable oil of about 0.1 wt % or less; (ii) an organic hydrophobic carrier, preferably a vegetable oil, hydrocarbon oil or paraffin oil, or a derivative thereof; wherein the at least one growth regulator which is insoluble or unstable in water, is present in the liquid dispersion in an amount exceeding 0.1 wt %; and wherein more than 90% of the particles of said growth regulator has a particle size of between 1-7 μm; wherein the dispersion further comprises (iii) an emulsifier which stabilizes the dispersion in the organic carrier, and which causes the concentrate to be water miscible and self-emulsifying when diluted in water in a suitable dilution, such as for example a 1:50 dilution or higher dilution; wherein the dispersion is essentially water free.

11 Claims, No Drawings

GROWTH REGULATOR CONCENTRATE AND USE THEREOF

CROSS REFERENCE TO RELATED APPLICATIONS

This application is a continuation of PCT application number PCT/EP2014/067822 filed on 21 Aug. 2014, which claims priority from European application number 13181619.1 filed on 23 Aug. 2013. Both applications are hereby incorporated by reference in their entireties.

BACKGROUND OF THE INVENTION

1. Field of the Invention

The invention relates to a growth regulator concentrate for agriculture. Furthermore, the invention relates to use of said growth regulator concentrate in crops, preferably broad acre crops like cereal crops.

2. Description of the Related Art

In many horticultural and agricultural applications, growth regulators (growth inhibitors or growth stimulants) are applied for a variety of reasons. For example, it can be useful to increase the speed of growth, increase root formation, seedling setting and the like. It may also be useful to reduce growth in order to have short stems in grain culturing, reduce seed formation in citrus fruits and the like.

Such plant growth regulators are generally considered to comprise plant hormones, chemical compounds that act like plant hormones, and chemical compounds that inhibit the effect of plant hormones (or inhibit the natural production of plant hormones in a plant and in this way reduce the effect of plant hormones).

Many of the growth regulators are applied on the crop by spraying in a diluted solution in water, like insecticides, acaricides, fungicides, herbicides and the like. Generally, the farmer appreciates liquid formulations that can easily be admixed with water to result in homogeneous mixtures without additional process steps. Often, a farmer wants to apply several active compounds in one spray run. Hence, the active compounds are generally supplied as concentrated liquids. In practice, the concentrate needs to be storage stable for at least two years. In a first year the concentrate may be bought by a farmer, but in the end it may not be necessary to use the product at all, or only in part. Hence, a farmer requires that the concentrate can be used easily the next year as well.

Providing a liquid concentrate is quite easy in case the active substance is water soluble and stable in water, as a concentrated solution of the active substance is supplied. In a number of cases this is not possible, because a water soluble active substance may be not sufficiently stable and/or not sufficiently water soluble.

A number of active substances are sparingly soluble in water, or unstable, and therefore are supplied in a number of other ways, including a concentrated solution in a solvent suitable for dissolving said active, which solvent is miscible with water. Another options is to prepare a dispersion in water, as such dispersion is most easily mixed with water before spraying. A prerequisite for such dispersion in water is, that the active is stable in water.

Also, more complicated systems are developed, like fastly disintegrating granules, dispersions of oily liquids in watery liquids, dispersions of solids in organic liquids and the like.

However, it becomes increasingly difficult to predict whether certain formulations may be suitable for certain actives. Examples of formulations are disclosed in WO2012/108873, WO2012/167322, WO2011/012495, WO2005/084435 (US2007/281860), WO2002/035932, WO2001/62080, U.S. Pat. No. 6,458,746, EP2225940 and WO2001/093679.

In a number of cases, concentrates with relatively low amount of active are deemed acceptable by the farmer. In other cases, it is accepted that farmers need to assure that solids are sufficiently well dissolved, or mixed, in order to apply an active equally over the crop in a complete spraying run.

The present inventors were interested to develop useful concentrates for growth regulators (i.e. plant growth regulators) like prohexadione and gibberellins, like gibberellic acid (GA3), GA7 and GA4, auxins and/or kinetins, alone or in combination.

Many of these growth regulators are scarcely soluble and in particular are unstable in water.

Hence, these growth regulators are supplied in a number of ways, depending on the individual characteristics.

Prohexadione (mostly used as prohexadione-Ca-salt) can be supplied as granules, as for example described in WO2011012495. Conventional liquid formulation approaches such as soluble concentrate, emulsifiable concentrate or suspension concentrate are not possible due to low solubility of Prohexadione in solvents (including water) and hydrolytic instability in water. Prohexadione calcium is known to be supplied in admixture with mepiquat-chloride. The latter formulation is a dispersion of the active in a watery liquid. This formulation is storage stable (i.e. does not show phase separation) when kept at one temperature. However, in cold/warm cycling, this formulation appears to be unstable, and settling occurs within several cycles. This is a distinct disadvantage, as the products are often kept by the farmer in unconditioned storage facilities, and one may expect that the product is always subjected to cold/warm cycling. A further disadvantage is the fixed combination and ratio with mepiquat-chloride which limits the flexible use on different crops. Farmers often also want to use other actives in combination, in particular other growth regulators, like chlormequat, ethephon or triazoles with growth regulation activity like metconazole and tebuconazole and the like.

Gibberellic acid (GA3) is commonly supplied as a solution in an organic polar solvent; its solubility is such that generally a 3-4 wt % solution is provided. Such solvent, like an alcohol, is considered environmental unfriendly (being a VOC) and is inflammable.

BRIEF SUMMARY OF THE INVENTION

It is an object of the invention to provide a growth regulator concentrate of certain growth regulators, for agriculture (i.e. plant growth regulators), without the disadvantages of concentrates according to the prior art. Furthermore, it is an object of the invention to provide methods of using said growth regulator concentrate to treat plants, preferably broad acre crops.

The object of the invention is achieved by providing a liquid dispersion comprising:
  at least one growth regulator which has a solubility in vegetable oil of about 0.1 wt % or less;
  an organic hydrophobic carrier;
  wherein the at least one growth regulator is insoluble or unstable in water, and is present in the liquid dispersion in an amount exceeding about 0.1 wt %;

wherein more than 90% of the particles of said growth regulator have a particle size of between about 1 µm to about 7 µm;

wherein the dispersion further comprises an emulsifier which stabilizes the dispersion in the organic carrier, and which causes the concentrate to be water miscible and self-emulsifying when diluted in water in a suitable dilution, such as for example a 1:50 dilution or higher dilution;

wherein the dispersion is essentially water free.

The dispersion according the invention is suitable to be diluted in water, in order to be able to spray the active compound on plants. Hence, the present invention also relates to a water based spraying liquid for spraying plants, wherein the liquid comprises water and a suitable amount of the dispersion described in the preceding paragraph. Generally, about 50 mL or more, preferably about 500 mL or more up to about 20 L or less of said dispersion is used per hectare. Generally, the dispersion is diluted to an amount of about 50 L or more up to about 2500 L or less per hectare.

The invention furthermore relates to a method for treating plants with at least one growth regulator, wherein the above described water based spraying liquid is sprayed on plants in an amount such that the effective amount of dispersion is about 50 mL or more, preferably about 500 mL or more up to about 20 L or less of said dispersion per hectare. The spray solution made by dilution the of the product will generally be sprayed at a volume of about 50 to about 2500 L/ha.

It is a distinct advantage of the dispersions of the present invention that relatively high concentrated liquid formulations can be provided to farmers. For example, presently, the GA3 liquids have 3-4 wt % of active in solution.

The present invention allows dispersions to have a concentration of a plant growth regulator of about 4 wt % or more, preferably of about 5 wt % or more or about 6 wt % or more, such as for example between e.g, 10 and 25 wt %, such as for example about 11 wt %, about 15 wt % or about 20 wt %. The amount generally will be 30 wt % or lower.

DESCRIPTION OF ILLUSTRATIVE EMBODIMENTS

The following is a description of certain embodiments of the invention, given by way of example only.

The at least one growth regulator is insoluble in the hydrophobic carrier. In case the solubility of the active in the hydrophobic carrier is higher than about 0.1 wt %, the active may dissolve and recrystallize over time, in particular upon temperature cycling, which may cause instability. Therefore, the active preferably has a solubility in vegetable oil of less than about 0.1 wt %.

The solubility of the active in oil may be determined by mixing 0.1 wt % of active compound in sunflower oil, and determining whether a clear solution is obtained. A more precise method may be, to mix 0.1 wt % of active in sunflower oil for 30 minutes, at 25° C., apply a filtration step, and measure the amount of active in the filtrate quantitatively with HPLC.

The at least one growth regulator is insoluble in water and/or is unstable in water.

A growth regulator is considered to be insoluble in water in case the solubility is less than about 0.1 wt %.

The invention is particularly suitable for growth regulators that are considered unstable in water as tested with standard stability tests for hydrolysis and light, according to guidelines EPA Subdivision N-161-1 and 161-2 (hydrolysis and direct transformation in water (photolysis) respectively), the disclosure of which is here specifically incorporated by reference.

In one embodiment, the growth regulator, or plant growth regulator, is chosen from the group of plant hormones, or chemical compounds with analogous activity. Suitable examples of such compounds are auxins, cytokines, gibberlins, ethylene precursors (like ethephon), or abscisic acid.

In another embodiment, the growth regulator, or plant growth regulator, is a growth inhibitor, like for example chlormequat or mepiquat chloride, certain triazole or triazole like compounds, or prohexadione, daminozide, trinexapac ethyl type compounds, or ethylene inhibitors.

Within the group of plant growth regulators, the invention is applicable for those compounds that conform with the requirements as described in the claims.

Solubility and stability of the compounds in water is generally known for the registered compounds. Solubility in e.g. vegetable oil can be easily determined by the skilled person. As explained, compounds that are largely insoluble in water can be used in formulation of the present invention, but in case these are chemically stable in water, other options may be cheaper, like for example dispersions in water. The present invention is particularly useful for those compounds that are unstable in water.

The organic hydrophobic carrier is preferably a vegetable oil, hydrocarbon oil or paraffin oil, or a derivative thereof.

One way to denote the hydrophobicity, is to determine the solubility in water. Preferably, the solubility in water is lower than about 1 g/Liter, which means that it preferably has a solubility in water of lower than about 1 g/Liter, more preferably about 0.5 g/L or less. The solubility can be measured at room temperature (e.g. 20° C.). However, the amount of allowable water may be dependent on further additives, the instability of the active ingredient and the like.

The at least one growth regulator is present in the carrier liquid as a dispersion, i.e. in an amount exceeding the solubility of the growth regulator in the organic carrier. To be commercially viable, the dispersion will have an amount of active ingredient of about 0.1 wt % or more, as some growth regulators are active when very low amounts are applied. Depending on the type of growth regulator, the amount present in the dispersion will be about 3 wt % or more, more preferably about 6 wt % or more. Generally, the amount will be about 30 wt % or less, preferably about 25 wt % or less. The present invention allows dispersions to have a concentration of active between e.g, 5 or 10 and 25 wt %, such as for example about 15 wt % or about 20 wt %. This relatively high concentration is an advantage, as it allows less waste, less packaging recycling and lighter products for the same amount of active.

The dispersed particles generally have a small particle size. Generally, more than 90% of the particles of said growth regulator will have a particle size of about 1-7 μm or less, preferably about 5 μm or less.

The dispersion further comprises an emulsifier which stabilizes the dispersion in the organic hydrophobic carrier (hereinafter also the oil dispersion), and which causes the concentrate to be water miscible and self-emulsifying when diluted in a suitable dilution in water. A suitable dilution is the dilution in which the dispersion will be used in practice. For testing purposes, it may be adequate to use for example a 1:50 dilution or higher dilution like 1:100.

The emulsifier has several roles. The influence on the stability of the oil dispersion can be assessed by storage stability tests of the concentrate. The self-emulsifying property of the oil dispersion can be tested by adding a suitable amount of dispersion in water. For example, one could add 1 wt % of oil dispersion to water, and invert the vessel with the mixture a few times (i.e., turning the vessel upside down). Generally, a stable emulsion should have been formed when 8 times turning the vessel upside down, or less. Preferably, the dispersion is emulsified in water with inverting the vessel 4 times or less, preferably about two times or less. The precise structure of the emulsion in water is not so important, as long as the at least one active ingredient is well dispersed, and the mixture is stable. Generally, at least the oil forms an emulsion in the water phase. The at least one active may be dispersed, or dissolved in the water phase, and/or may be present in the oil as particles. Furthermore, the emulsifier may act as an adjuvant, promoting the uptake of the active ingredient into the plant.

The dispersion is essentially water free, which means that preferably the oil dispersion contains less than about 0.4 wt % water, more preferably about 0.2 wt % or less, as can be measured with Karl Fisher titration.

The dispersion according the invention preferably comprises at least one of a gibberellin and/or a prohexadione as the growth regulator.

Prohexadione can be used as free base or ester, but is generally used as salt. A preferred salt is prohexadione-calcium. A prohexadione salt like the preferred prohexadione Ca preferably is present in an amount of about 4 wt % or more, preferably about 5 wt % or more. Generally, the amount will be about 25 wt % or less, preferably about 20 wt % or less. Suitable amounts include about 10 wt % or less, like for example about 8 wt % or less.

The dispersion according the invention, if the composition comprises prohexadione Ca salt as the growth regulator, preferably comprises additionally an ammonium compound, such as for example ammonium nitrate, ammonium propionate, ammonium sulphate, or ammonium phosphate, preferably ammoniumsulphate. The ammonium sequestrates the calcium ion, which otherwise may hamper the uptake of the growth regulator by the plant. A cationic emulsifier, such as those described below, can also be used as ammonium compound.

The dispersion according the invention furthermore, preferably comprises an acidifier, such as preferably an organic acid, like preferably citric acid, adipic acid or acetic acid.

These salts and/or acids may be dispersed or dissolved in the oil phase according to their solubility properties.

Suitable gibberellins include gibberellic acid (GA3), GA7 and others. More generally, the term "gibberellins" encompasses diterpenoids having a tetracyclic ring system. In terms of their nomenclature, gibberellins were numbered in order of their discovery, so the numbering does not signify the position of one particular substituent. The compounds have nineteen or twenty carbons, and four or five ring systems. Some examples of gibberellins include GA3, commonly referred to as gibberellic acid; and GA4 and GA7, which are immediate precursors of GA3. There are approximately 130 gibberellins described today, and all are encompassed by the general term "gibberellin". In the formulations, either a single gibberellin or a combination of two or more gibberellins may be employed. The gibberellin(s) may be selected from the group consisting of gibberellin A2 (GA2), gibberellin A3 (GA3), gibberellin A5 (GA5), gibberellin A7 (GA7), gibberellin A14 (GA14), and mixtures thereof.

In a preferred embodiment of the invention, the amount of GA3 preferably is about 10 wt % or more, and even more preferable about 15 wt % or more. Generally, the amount will be about 30 wt % or less, preferably about 25 wt % or less. Very suitable amounts may be about 18 wt %, about 20 wt % or about 23 wt %.

The amount of other gibberellins depend on the specific compound, and will generally be between about 1 to about 25 wt %, preferably between about 5 wt % and about 25 wt % and more preferably between about 7 wt % and about 20 wt %.

Prohexadione and gibberellins are considered hydrolytically unstable, which means that they do not meet the shelf life requirements of 2 years storage, if they are kept in water.

The dispersion according to the present invention may further comprise additional growth regulators. Preferred additional growth regulators include one or more of chlormequat, ethephon, triazoles with growth regulation activity like metconazole and tebuconazole and the like, an auxin and/or cytokinin.

Suitable auxins include natural or synthetic chemicals that behave like the naturally occurring auxins produced by plant enzyme systems, and the term "auxin" and "auxins" as used herein refers to such compounds in natural and synthetic form. Indoleacetic acids, indol-3-butyric acid (3-BA); naphthaleneacetamide; 2 methyl-1-naphthaleneacetic acid and 2-methyl-1-naphthylacetamide have hormonal activity and may be substituted for the naturally occurring auxins. It may be useful to have metal ions present with the auxins, such as for example zinc or manganese. In preferred embodiments, the auxin employed is selected from the group consisting of 3-indolebutyric acid, 3-indoleacetic acid, 1-naphthylacetic acid, 3-indolebutyric acid, and salts and esters thereof. Preferably, the metal ions required for a good activity are supplied together with the auxin.

Suitable cytokinins are a class of plant regulation substances (phytohormones) that promote cell division, or cytokinesis, in plant roots and shoots. There are two types of cytokinins: adenine-type cytokinins represented by kinetin, zeatin, and 6-benzylaminopurine (also referred to as BAP, 6-BAP, or 6-benzyladenine), and phenylurea-type cytokinins like diphenylurea and thidiazuron (TDZ). In preferred embodiments the cytokinin is selected from the group consisting of kinetin (synthetic or derived from seaweed), 6-BAP, 1-(2-chloropyridin-4-yl)-3-phenylurea (CPPU), and TDZ.

The dispersion according to the invention preferably comprises a vegetable oil, hydrocarbon or paraffin oil, or a derivative therefrom as an organic hydrophobic carrier. The organic carrier has a low solubility in water, i.e. is a non-polar, hydrophobic liquid. Thereby, the dispersion can remain essentially water free.

Preferably, the carrier material is a vegetable oil with a melting point of about 10° C. or lower, preferably of about 0° C. or lower. Suitable vegetable oils are e.g. palm oil, soybean oil, rapeseed oil, sunflower oil, cotton seed oil, palm kernel oil, coconut oil, linseed oil, olive oil, peanut oil and the like. Suitable derivatives of vegetable oils include alkyl esters of the fatty acids, like for example C1-C6-alkyl esters, like for example bio-diesel, or methyl esters of rape seed oil and the like.

Even though vegetable oils are preferred for environmental reasons, other organic fluids can be used, like hydrocarbon oils such as toluene, naphthalene, octane, decaline, or paraffin oils such as C15-C30 hydrocarbons are suitable, optionally in admixture with lower carbon number alkanes.

The dispersion according to the invention contains an emulsifier as an essential ingredient. Firstly the emulsifier acts as a dispersant to enhance the dispersibility of the insoluble particles of the growth regulator initially and to enhance the storage stability of the dispersion. Secondly the emulsifier aids in the dispersion of the growth regulator particles on dilution in water and thirdly the emulsifier aids in the emulsification of the carrier fluid in the water phase. Also, the emulsifier may promote the uptake of the active by the plant.

Preferably, the emulsifier is an alkoxylated sugar, preferably esterified with fatty acids. Suitable sugars, or polyols, arc pentacritritol, sorbitol, maltose, trimethylolpropane, ethyleneglycol and the like. The alkoxy groups preferably are ethyloxy or propyloxy, and most preferably at least comprise at least 3 ethoxy groups, preferably at least 5 ethoxy groups. Esterification with fatty acids may comprise esterification with C12-C24 fatty acids, wherein the fatty acids may be unsaturated, and preferably arc monounsaturated. The inventors have found the ethoxylated sorbitans to be most preferred emulsifiers. Examples of such ethoxylated esterified sorbitans are Atlas G 1086, Atlas G 1096, Arlatone TV. Further suitable dispersants are Atlox 4912, Atlox 4914 and Atlox LP-1, which comprise ethoxylated polyhydroxystearic acid, copolymers of fatty acid. Further suitable emulsifiers include alcohol-alkylene oxide addition products, such as tridecyl alcohol-C16 ethoxylate; ethoxylated fatty acids such as castor oil ethoxylate (EO 25 or 40) and polyethylene glycol esters of fatty acids, such as polyethyleneglycol stearate.

Hence, the preferred emulsifier is non-ionic, and comprises at least one fatty acid group, at least one polyethoxy group, or more than one ethoxy group, and at least one polyol (diol, triol or higher alcohol), wherein the fatty acid and polyol may be combined in hydroxyl-fatty acid.

It may be useful to use more than one emulsifier. Suitable additional emulsifiers are anionic, cationic or further nonionic emulsifiers.

Typical emulsifiers, or surface-active agents, are alkyl sulphate salts, such as diethanol ammoniumlaurate sulphate, alkylarylsulphonate salts, such as like calcium dodecyl benzene sulphonate, alkylphenol-alkylene oxide addition products, such as nonylphenol-C18 ethoxylate; alcohol-alkylene oxide addition products, such as tridecyl alcohol-C16 ethoxylate; ethoxylated fatty acids such as castor oil ethoxylate (EO 25 or 40), soaps such as sodium stearate; alkylnaphthalene-sulphonate salts such as sodium dibutylnaphthalenesulphonate; dialkylesters of sulphosuccinate salts, such as sodium di(2-ethylhexyl) sulpho-succinate; sorbitol esters such as sorbitol oleate; quaternary amines, such as lauryl trimethylammonium chloride; polyethylene glycol esters of fatty acids, such as polyethyleneglycol stearate; block-copolymers of ethyleneoxide and propylenenoxide; salts of mono and dialkyl phosphate esters; polyamine-fatty acid condensates; random polyester condensates; lecitine or modified lecitines; mono- or di-glycerides and the like.

The amount of emulsifier is generally about 10 wt % or more, preferably about 15 wt % or more. Generally, the amount will be about 30 wt % or less. Suitable amounts include about 18 wt %, about 20 wt % or about 22 wt %. The amount is the total amount of the combined emulsifiers.

The dispersion according the invention may comprise further components, such as for example at least one of a further growth regulator, a fungicide, an anti-settling agent, an antioxidant, a biocide, an antifoam, a metal compound, or another additive known in the art like safeners, colorants and the like.

The dispersion according to the present invention may further comprise a fungicide. Preferably, one or more of the following fungicides is used: Specific anti powdery mildew fungicides such asmorfolines like fenpropidine and fenpropimorf, metrafenonc, cyflufenamide, quinoxyfen and proquinazid; SBI fungicides like triazoles like epoxyconazol, prothioconazole, metconazole, tebuconazole etc; Strobilurines (Qol fungicides) like azoxystrobin, coumoxystrobin, dimoxystrobin, enoxastrobin, famoxadone, fenamidone, fenaminostrobin, fluoxastrobin, flufenoxystrobin, kresoxim-methyl, metominostrobin, orysastrobin, pyraoxystrobin picoxystrobin, pyraclostrobin, pyrametastrobin, pyribencarb, triclopyricarb trifloxystrobin and SDHI like fungicides like benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane and thifluzamid.

Suitable further compounds that can be added are jasmonates or phoshonic acid, which strengthen the defence mechanisms of the plants. Suitable jasmonates include methyl jasmonate, propyldihydrojasmoante and jasmonic acid.

Suitable further compounds that can be added are metal compounds, such as for example zinc, manganese, selenium, iron copper, boron, molybdenum, and magnesium and the like. The metal ions can be used as chelates or salts, like for example EDTA chelates, citrate salts, proteinates or otherwise in a form that the metals are absorbed by the plant leafs.

The dispersion according to the present invention preferably further comprises at least one additive to reduce settling. Preferred anti-settling agents include silica (like fumed silica) or clay (like bentonite). The amount of anti-settling agent preferably is about 5 wt % or less, preferably about 3 wt % or less, and even more preferred, about 2 wt % or less, like for example about 1 wt %. Other anti-settling agents include polymers, like for example polyester block copolymers or polyamides, such as for example Atlox Rheostrux type polymers. These additives to reduce settling are generally used in an amount of about 10 wt % or less, preferably about 5 wt % or less and can be e.g. 3 wt % or less. The additive will generally be used in an amount of about 0.3 wt % or more, like for example about 0.5 wt % or more, and more preferably about 1 wt % or more.

The dispersion according the invention may further include an anti-oxidant, such as for example vitamin-E, butylated hydroxyanisole, Vulkanox BHT (2,6-di-tert.-butyl-p-cresol) or butylhydroxytoluene.

The dispersion of the invention may further include an antifoam such as silicone based oils, magnesiumstearate or octanol.

The dispersion according the invention may further include a biocide, like a bactericide and/or algicide, like for example isothiazolin-3 derivatives, like benzyl-isothiazolin, n-octyl isothiazolinone, chloro-methyl and methyl isothiazolinone; bromo-nitro-propane-diol; ethylenedioxydimethanol; (3-(3,4-dichlorophenyl)-1,1-dimethylurea; iodo-propynyl butyl carbamate; N-trichloromethylthiophtalimide; Zinc Pyrithione; dichlorophen, streptomycin, coppersulphate, or sorbate.

The further compounds—if solids—may be micronized, or may be used as larger particle sizes. Preferably, the particle size of all the solid components in the oil dispersion is about 30 μm or less, more preferably, about 20 μm or less, and even more preferably, about 12 μm or less.

The dispersion as described above is suitable to be diluted to obtain a water based spraying liquid for spraying plants.

Such water based spraying liquid comprises water and a suitable amount of dispersion. Further, other additives, actives etc. may be present, which can be separately mixed with the water.

A suitable dilution comprises about 96 wt % water or more and about 4 wt % of said dispersion or less. Preferably, the dispersion is diluted with water in a range of about 1:50 to 1:200 (in volume/volume). Suitable amounts of dispersion in water include 1 wt %, 1.25 wt %, 1.5 wt %.

The dispersion may comprise additional active compounds like further growth regulators, fungicides, insecticides, acaricides and the like. However, it may also be effective to add additional active compounds or additives to the water based spraying liquid. For example, such additional active compound may be stable and soluble in water and are preferably delivered to the farmer as concentrated solution in water. The dispersion according the invention allows a great freedom to operate for a farmer. Hence, additives or additional active components, to be used in combination with at least one gibberellin or prohexadione can be added to the dispersion, but can also be added directly to the water phase. In case of a prohexadione salt, an ammonium salt such as for example ammoniumsulphate, and an acid such as for example a carboxylic acid, such as for example citric acid, adipic acid, acetic acid or the like can be added to the water phase, instead of being part of the oil dispersion.

Suitable additional active compounds include further growth regulators, fungicides, phosphonic acid and jasmonates.

The additional growth regulators are as described above.

Suitable additional compounds include specific anti powdery mildew fungicides such as morfolines like fenpropidine and fenpropimorf, metrafenone, cyflufenamide, quinoxyfen and proquinazid; SBI fungicides like triazoles like epoxyconazol, prothioconazole, metconazole, tebuconazole etc; Strobilurines (Qol fungicides) like azoxystrobin, coumoxystrobin, dimoxystrobin, enoxastrobin, famoxadone, fenamidone, fenaminostrobin, fluoxastrobin, flufenoxystrobin, kresoxim-methyl, metominostrobin, orysastrobin, pyraoxystrobin picoxystrobin, pyraclostrobin, pyrametastrobin, pyribencarb, triclopyricarb trifloxystrobin and SDHI like fungicides like benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane and thifluzamid.

Suitable further compounds that can be added are jasmonates or phoshonic acid, which strengthen the defence mechanisms of the plants. Suitable jasmonates include methyl jasmonate, propyldihydrojasmoante and jasmonic acid.

Suitable further compounds that can be added are metal compounds, such as for example zinc, manganese, selenium, iron copper, boron, molybdenum, and magnesium and the like. The metal ions can be used as chelates or salts, like for example EDTA chelates, citrate salts, proteinates or otherwise in a form that the metals are absorbed by the plant leafs.

The present invention also relates to a method for treating plants with at least one growth regulator, wherein the above described water based spraying liquid is sprayed on plants in an amount such that the effective amount of dispersion is about 50 mL or more, preferably about 500 mL or more up to about 20 L or less of said dispersion per hectare.

Preferred amounts of the effective amount of dispersion are between about 0.5 L to about 5 L, and more preferably about 1-2 L for one hectare.

The spray solution made by dilution of the dispersion will generally be sprayed at a volume of about 50 L/ha to about 2500 L/ha, preferably about 200 L/ha to about 1000 L/ha.

The method according the invention is preferably applied to broad acre crops. Suitable broad acre crops include tuber or root crops, cereals, oil crops and other crops. Suitable tuber or root crops include potatoes or sugar beet. Suitable cereals include maize, rice, wheat, barley, rye and grain. Suitable oil crops include soy bean, sunflower, rape-seed or peanut. Other crops include clover, cotton or mustard.

In one preferred embodiment, the preferred broad acre crop is cereal, preferably barley, wheat, and grain. This crop is in particular preferred for the application of prohexadione-calcium comprising spraying liquid.

EXAMPLES

General process description for example 1-9:

Prohexadione-calcium technical grade was hammer-milled through a 0.5 mm screen. Next, the prohexadione-calcium was micronised using a 100 mm fluid energy mill till an average particle size of 2-3 µm. All particles were smaller than 8 µm; more than 90 wt % of the particles were in the range of 1-4 µm.

Atlas G1086 or G1096 was dispersed in the vegetable oil with stirring to obtain a liquid phase.

Micronised prohexadione-calcium was dispersed in the liquid phase comprising the vegetable oil and the emulsifier with stirring, optionally with Aerosil 200 mixed together with the prohexanedione calcium.

Next, the liquid suspension was passed through the IKA Magic Lab fitted with the 6F rotor, speed 15,000 rpm. Three passes were made.

Examples 1-3

The following formulations were prepared according to the general description:

| Example Ingredient | 1 | 2 | 3 |
|---|---|---|---|
| | Concentration (Wt %) | | |
| Micronized prohexadione calcium | 6.0 | 6.0 | 6.0 |
| Atlas 1086 | 23.0 | 23.0 | 23.0 |
| Corn oil | 71.0 | | |
| Sunflower oil | | 71.0 | |
| Radia 7961* | | | 71.0 |

*Rape seed methyl ester

The oil dispersions were stable on storage and temperature cycling. Dilution in water revealed the following results: 1.25 wt % of the dispersion was mixed with water at 30° C. to 250 mL; As water, standardized CIPAC water type A and D were used.

| Example | 1 | | 2 | | 3 | |
|---|---|---|---|---|---|---|
| CIPAC water | A | D | A | D | A | D |
| Dispersion when added to water | Fair | Fair | Good | Fair | good | Good |
| number of inversions to disperse completely | 4 | 4 | 1 | 1 | 1 | 1 |
| Separation (ml) after 72 hours | | | | | | |
| Cream | 2 | 2 | 2 | 2 | 5 | 3 |
| Oil | <0.1 | <0.1 | <0.1 | <0.1 | 0 | 1 |
| Sediment | 0.1 | 0.1 | 0.1 | 0.1 | 0.1 | 0.1 |
| Number of inversions to redisperse sediment | 4 | 2 | 2 | 2 | 4 | 3 |

The suspensibility of the three examples was good according to CIPAC method MT184 in CIPAC D, at a rate of 1% v/v at 30° C.

Examples 4-7

The following examples were prepared according to the general process description.

| Example Ingredient | 4 | 5 | 6 | 7 |
|---|---|---|---|---|
| | \multicolumn{4}{c|}{Concentration (wt %)} | | | |
| Micronized prohexadione calcium | 5.3 | 5.3 | 5.3 | 5.3 |
| Atlas G1086 | 21.3 | 21.3 | | 21.3 |
| Atlas G1096 | | | 21.3 | |
| Aerosol 200 | 1.1 | 1.1 | 1.1 | |
| Aerosol R812 S | | | | 1.1 |
| Corn oil | 72.3 | | 72.3 | 72.3 |
| Sunflower oil | | 72.3 | | |

The following stability data were obtained with the formulations; storage was 2 weeks at 54° C.

| Example | 4 | 5 | 6 | 7 |
|---|---|---|---|---|
| Supernatant (ml) | 8 | 10 | 10 | 12 |
| Gelling | No | Partially | No | No |
| Sediment | No | No | No | No |

These results show that no sediment is formed, and only a little supernatant. In this specific combination, sunflower oil appeared to be slightly worse in gelling performance.

Example 8

The formulation of example 4 was prepared on 1 L scale, and further stability tests were performed, while using the commercial best formulation (Medax Top) was used as a comparison. It appeared that Medax Top had more than 50% supernatant after 5 times cycling between temperatures of −10° C. to +20° C., whereas the formulation according the invention exhibited only 4-6% supernatant. Other characteristics, like pH (method CIPAC MT 75.3; 1% diluted in water), suspensibility in water (CIPAC MT184, CIPAC D, rate 1.25% v/v, temp 30° C.), spontaneity of dispersion (CIPAC MT 160, CIPAC D, rate 1.25% v/v, temperature 30° C.) and particle size (CIPAC MT 187, Fraunhofer model) were stable upon storage testing (54° C. for 2 weeks).

Example 9

The formulation of example 4 was prepared on 5 L scale, and further tests were performed, as summarized in the following table.

| Test | | Result |
|---|---|---|
| pH 1% dilution in deionized water (CIPAC MT 75.3) | | 7.2 |
| Density g/cm$^3$ | | 0.968 |
| Suspensibility CIPAC MT 184 (rate 1.25% v/v, CIPAC water D used) | | 103 |
| Spontaneity of dispersion CIPAC 160 (rate 1.25% v/v) | | 103 |
| Wet sieve retention % retained (CIPAC MT167) | 150 mum | 0.01 |
| | 45 mum | 0.02 |
| Persistent foam (ml) after CIPAC MT 47.2 (rate 0.2% w/v, CIPAC water D used) | 10 sec | 24 |
| | 1 minute | 20 |
| Moisture content % w/w | | 0.19 |
| Viscosity mPa · s | @ 100 s$^{-1}$ | 128 |
| Particle size (μm) CIPAC MT187, Fraunhofer model used | D90 | 5.7 |
| | D50 | 2.7 |
| | D10 | 1.2 |
| Particle size (Microscopic examination) | Maximum (μm) | 13 |
| | Mainly (μm) | 2 |
| | Aggregation (%) | 0 |
| Emulsion stability CIPAC MT 36.3 tested at 1.25% v/v | | Emulsion satisfactory after 30 min, 2 hr and 24 hr. Any separation after 24 hr satisfactory re-emulsified |

With the preparation of example 9, field trials were performed on winter wheat and winter barley. Ammonium-sulphate and citric acid were added to the water in 1 wt %. Spraying was excellent, and take up by the plants was very good.

Examples 10-11

The formulations as given in the next table were made with GA3 (90.5% pure), by dispersing the GA3 in the liquid part and milling the GA3 till a mean particle size (D50) of 2.5 μm was obtained. Amounts are reported as wt %.

| Product | Type | Example 10 | Example 11 |
|---|---|---|---|
| GA3 (90.5%) | Plant growth regulator | 16.2 | 11.2 |
| Corn oil | Organic hydrophobic carrier | 31.0 | 33.65 |
| Methylated rape seed oil | Organic hydrophobic carrier | 31.0 | 33.65 |
| Sorbitol oleyl ethoxylate (EO40) | Emulsifier | 7.4 | 7.4 |
| Isotridecanol ethoxylate (EO8) | Emulsifier | 3.7 | 3.7 |
| Calcium dodecyl benzene sulphonate | Emulsifier | 3.7 | 3.7 |
| Polyethyleneglycol adduct of polyhydroxystearic acid | Emulsifier | 1.7 | 1.2 |

-continued

| Product | Type | Example 10 | Example 11 |
|---|---|---|---|
| Aerosol R972 | Additive to reduce settling (silica) | 4.5 | 4.5 |
| Bentone 1000 | Additive to reduce settling (clay) | 1.0 | 1.0 |

Several dilution tests, immediate and upon aging were performed on the oil dispersion, as shown in the next table.

| | Example 10 | | Example 11 | |
|---|---|---|---|---|
| Test Storage | % supernatant | % sediment | % supernatant | % sediment |
| 2 weeks 54° C. | Trace | 0 | Trace | 0 |
| 8 weeks 40° C. | 5 | 0 | 4 | 0 |
| Suspensibility* | initial | 2 weeks at 54° C. | initial | 2 weeks at 54° C. |
| CIPAC MT 174 Spontaneity* | 97 | 98 | 97 | 92 |
| CIPAC MT 184 | 101 | 101 | 101 | 101 |

*carried out in CIPAC D water at 30° C. in 1% dilution

As is clear from these examples, GA3 can be stably dispersed in oil at substantial concentrations. The oil dispersion can be well suspended into water. Further, the dispersion is stable and suitable for use upon accelerated aging.

Examples 12-16

With prohexadione calcium as plant growth regulator, several formulations were made with adjuvants, in amounts (concentration in g/L) as described in the table below.

| Ingredient | Example 12 | Example 13 | Example 14 | Example 15 | Example 16 |
|---|---|---|---|---|---|
| Prohexadione calcium | 50 | 50 | 50 | 50 | 50 |
| Atlas G1086 | 200 | 200 | 200 | 200 | 200 |
| Atlox 4912 | | 9.3 | 7.0 | | |
| Atlox 4914 | 25 | | 25 | | 25 |
| Ammonium sulphate | 100 | | 100 | | |
| Adipic acid | | 31 | 28 | | |
| Pine needle oil | | | | 50 | |
| Tween 20 | | | | 50 | |
| Betaine hydrochloride | | | | | 100 |
| Aerosol 200 | 5 | 10 | 5 | 10 | |
| Corn oil | To 1 L | To 1 L | To 1 L | To 1 L | To 1 L |

The prohexadione calcium was prepared as described in the general description (see before example 1). The solid adjuvants ammonium sulphate (hammer milled through 0.5 mm screen, before dispersing, and milled at 4000 rpm in a Eiger mini motor mill with glass beads, particle size max: 12 μm, average 6 μm) and betaine hydrochloride (milled in a glass bead mill, particle size maximum 8 μm, average 4μ) were first dispersed in corn oil as 20% adjuvant and with 5% Atlox 4914 as a dispersant and milled. Adipic acid (milled in a Retsch rotor beater mill, final particles smaller than 20 μm) was prepared as 20% dispersion, with Atlox 4912 as dispersant in corn oil. Pine needle oil and Tween are liquids, and could be mixed in as is. The slurries were passed through IKA Magic Lab with a 6F rotor for final dispersion.

All oil dispersions were tested for emulsion stability as 1.25% v/v emulsions in water according to CIPAC MT 36.3. Emulsions were uniform, and after 30 min some froth was apparent (<6 ml), which disappeared upon standing. After 24 hr a small amount of top cream was observed, and in certain cases some sediment. The amounts were comparable or smaller than the reference (the reference was the same formulation, but without any adjuvant). Re-emulsion of any of the emulsions was easy and satisfactory in any of these cases. It can be concluded that dilution properties for all samples was very acceptable.

The invention has been described by reference to certain embodiments discussed above. It will be recognized that these embodiments are susceptible to various modifications and alternative forms well known to those of skill in the art without departing from the scope of the invention. Accordingly, although specific embodiments have been described, these are examples only and are not limiting upon the scope of the invention, which is defined in the accompanying claims.

What is claimed is:

1. A stable liquid dispersion comprising:
at least one growth regulator which has a solubility in vegetable oil of about 0.1 wt % or less, wherein the growth regulator is a gibberellin or a prohexadione;
an organic hydrophobic carrier which comprises an alkyl ester of a fatty acid of a vegetable oil;
wherein the at least one growth regulator is insoluble or unstable in water, and is present in the liquid dispersion in an amount exceeding about 0.1 wt %;
wherein more than about 90% of the particles of said growth regulator have a particle size of between 1-7 μm;
wherein the dispersion further comprises an emulsifier which stabilizes the dispersion in the organic carrier, and which causes the concentrate to be water miscible and self-emulsifying when diluted in water in a suitable dilution;
wherein the emulsifier is non-ionic, and comprises at least one polyethoxy group;
wherein the growth regulator is present in an amount of about 4 wt % or more and about 30 wt % or less; and
wherein the dispersion contains less than about 0.4 wt. % water.

2. The dispersion according to claim 1, wherein the dispersion comprises a prohexadione salt as the growth regulator, wherein the dispersion further comprises an ammonium compound, and/or an acidifier.

3. The dispersion according to claim 1, wherein the emulsifier is non-ionic, and comprises at least one fatty acid group, at least one polyethoxy group, and at least one polyol, wherein the fatty acid and polyol may be combined in hydroxyl-fatty acid.

4. The dispersion according to claim 1, wherein the dispersion further comprises at least one of a further growth regulator, a fungicide, an anti-settling agent, an antioxidant, a bactericide, a metal compound, or another additive common in the art.

5. The dispersion according to claim 1, wherein the dispersion further comprises further growth regulators and/or, wherein the dispersion further comprises at least one fungicide, chosen from specific anti powdery mildew fungicides, SBI fungicides, Qol fungicides and SDHI fungicides.

6. The dispersion according to claim 1, wherein the dispersion further comprises at least one additive to reduce settling.

7. A water based spraying liquid suitable for spraying plants, wherein the liquid comprises water and a suitable amount of the dispersion according to claim 1.

8. The spraying liquid according to claim 7, wherein the spraying liquid further comprises at least one additional growth regulator, fungicide, metal compound, and/or one or more jasmonites.

9. The spraying liquid according to claim 7, wherein if the growth regulator comprises prohexadione Ca salt, the liquid further comprises at least one of an ammonium salt and a carboxylic acid.

10. A method for treating plants with at least one growth regulator, wherein a water based spraying liquid according to claim 7 is sprayed on plants in an amount of about 50 L to about 2500 L per hectare.

11. The method according to claim 10, wherein the plants are broad acre crop.

* * * * *